April 21, 1936.  F. S. BURNS  2,038,412
GAS METER
Filed March 29, 1934
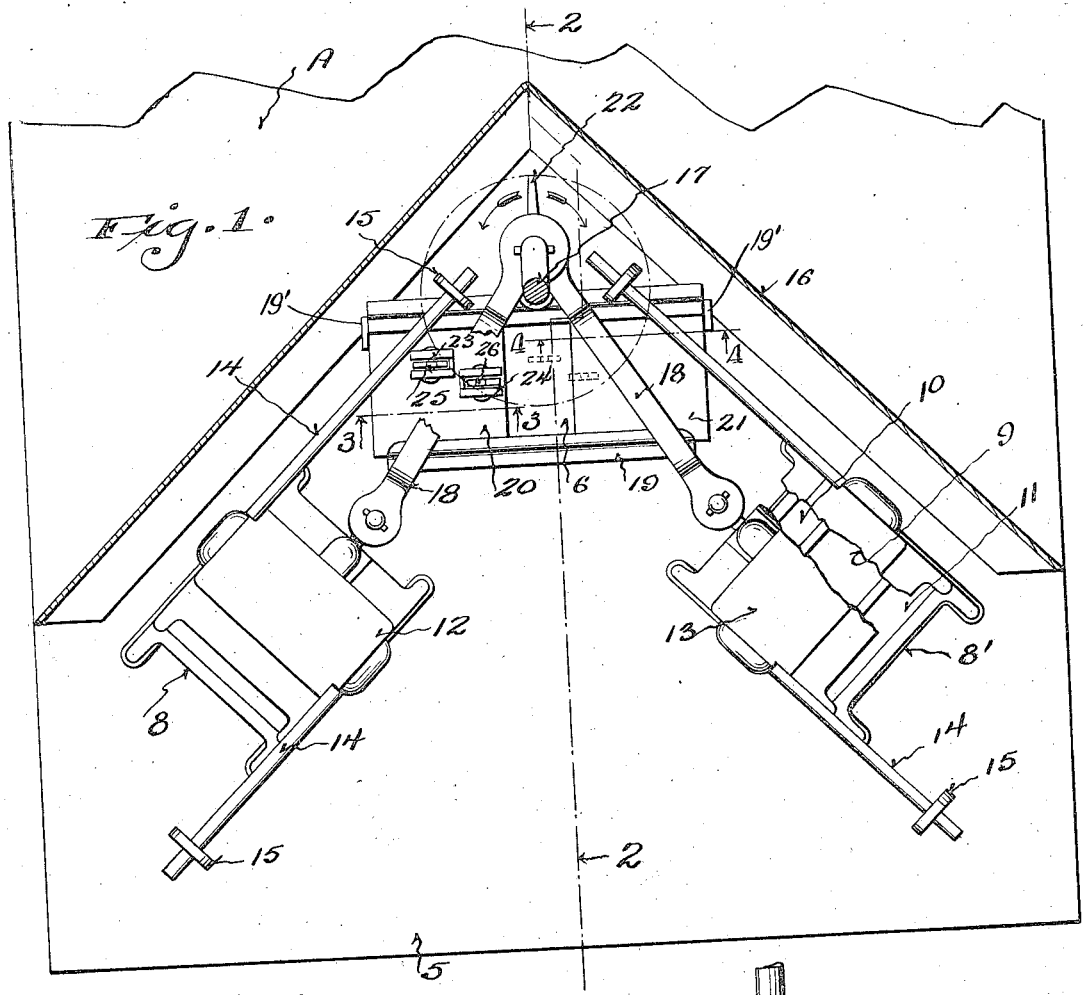
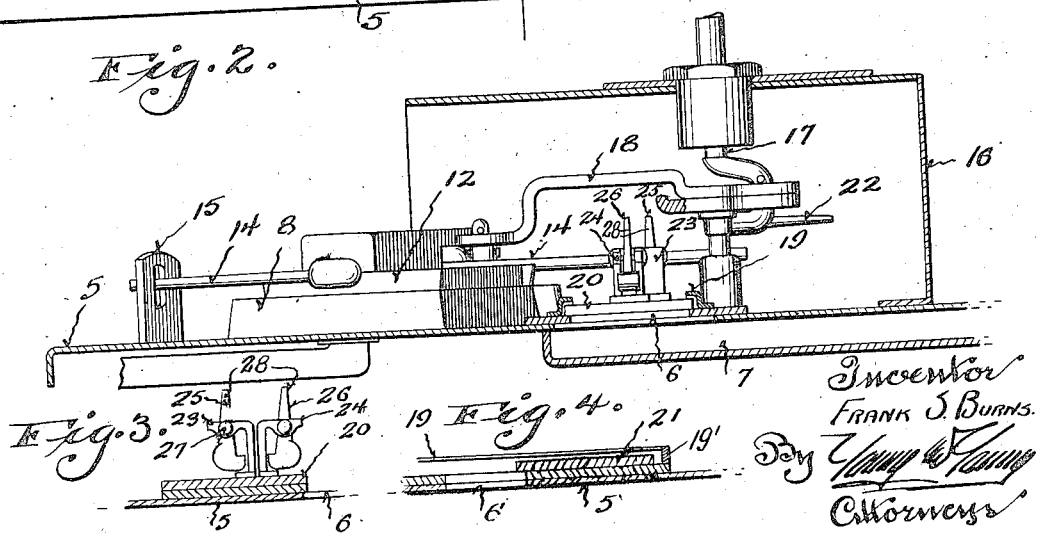
Inventor
FRANK S. BURNS.

Patented Apr. 21, 1936

2,038,412

UNITED STATES PATENT OFFICE 2,038,412

GAS METER

Frank S. Burns, Milwaukee, Wis.

Application March 29, 1934, Serial No. 717,905

5 Claims. (Cl. 73—1)

This invention pertains to gas meters of the type commonly used in homes and other buildings to register or measure in cubic feet the amount of gas drawn through the meter for lighting, cooking, heating, and other purposes.

In this type of meter, the casing is divided by a horizontally disposed valve plate into a valve compartment and a diaphragm compartment. The gas inlet communicates with the valve compartment through an inlet port, and on each side of the inlet port are groups of valve ports controlled by slide valves of the D type for regulating the flow of gas from the valve chamber to the diaphragms, and to the service outlet. The slide valves are actuated by a crank shaft, which is in turn operated by the flag arms from the bellows or diaphragms. The crank shaft also operates (through a worm gear and axle) the index or dial mechanism.

With this type of meter, when the differential changes, that is, when pressure inside of the meter becomes greater than the gas pressure, the gas is driven back through the main. One of the causes for this difference in pressure is that in some factories air under high pressure is used at the gas burners. Through mistake or error of connection, this air is forced through the meter and the gas is driven back in the main forming a highly combustible mixture. Not only have disastrous explosions occurred in the main, wrecking entire streets, but the failure of the flow of gas has caused whole districts to be temporarily cut off from its gas supply. This necessitates the individual warning to each house to shut off all gas appliances, in that when the back pressure ceases the flow of gas through open gas appliances would cause danger to the lives of the occupants of the houses.

Likewise, with this type of meter, unscrupulous persons having learned by tilting the meter to one side or the other the slide valves will be affected, which will permit the use of gas without the recording thereof at the index or dials.

It is therefore one of the salient objects of my invention to provide a novel means for automatically shutting off the inlet port when there is a tendency of the gas to flow back through the meter, the mechanism being of such a type that the inlet is insured of instantaneous closing and automatic re-opening when the pressure gas is such that the gas will again flow through the meter, whereby all danger of air, or other gas under pressure, flowing through the meter in a retrograde direction, is prevented.

Another salient object of my invention is to provide novel means for arranging the automatic shut-off for the inlet port in such a manner that when the meter is tilted by unscrupulous persons, the inlet port will be immediately closed thereby, and thus effectively prevent the theft of the illuminating gas.

A further object of my invention is to provide an automatic safety and intake valve device of the above character, which will be durable and efficient in use, and one that can be applied to conventional meters at a small cost and without any change to their ordinary operating mechanism.

With these and other objects in view the invention consists in the novel construction, arrangement, and formation of parts, as will be hereinafter more specifically described, claimed, and illustrated in the accompanying drawing, in which drawing:—

Figure 1 is a top plan view of the valve table and associate mechanism, showing my improved safety and anti-theft valve device applied to the inlet port, portions of the view being shown broken away and in section to illustrate the structural details.

Figure 2 is a vertical section through the valve table and associate mechanism, taken substantially on the line 2—2 of Figure 1, looking in the direction of the arrows.

Figure 3 is a detail vertical section taken on the line 3—3 of Figure 1, looking in the direction of the arrows, showing my improved attachment in detail, and illustrating the clicks or stops carried thereby.

Figure 4 is a detail sectional view, taken on the line 4—4 of Figure 1, looking in the direction of the arrows.

Referring to the drawing in detail, wherein similar reference characters designate corresponding parts throughout the several views, the letter A generally indicates a fragment of a gas meter. The gas meter A is of the type ordinarily employed, and will not be described in detail, and only sufficient parts thereof have been illustrated to enable one skilled in the art to understand the invention.

As shown, the meter A comprises a valve table 5, which extends horizontally across the top of the meter casing dividing the same into a top valve chamber and a bottom bellows or diaphragm chamber. The bellows or diaphragm chamber is further divided by a vertical partition so that the two bellows or diaphragms will be separated one from the other. The valve table 5 is provided with a gas inlet port 6, which has communication with the inlet pipe 7, leading from the inlet nipple or tube screw. Disposed on opposite sides of the inlet port 6 are groups of ports 8 and 8'. Each of the groups of ports 8 and 8' include a central port 9, and side ports 10 and 11. The central port 9 communicates with the gas outlet, and the ports 10 and 11 communicate respectively with the interior of the diaphragms and the diaphragm chambers or compartments.

Controlling the flow of gas through the groups of ports 8 and 8' are slide valves 12 and 13 of the D type. Each of the slide valves 12 and 13 are provided with oppositely extending valve guide rods 14, which are slidably mounted in guide eyes 15 rigidly secured to or formed on the valve table. A portion of the valve box enclosure is shown at 16.

Rotatably supported by the valve table 5 is a crank shaft 17, having its crank connected to the slide valves 12 and 13 by means of connecting rods 18. Consequently, during rotation of the crank shaft, the slide valves 12 and 13 will be reciprocated back and forth over the groups of ports to control the flow of gas from the valve chamber, diaphragms and diaphragm chambers, and to the outlet. The crank shaft carries the tangent (not shown) which is actuated by the flag arms from the bellows or diaphragms. The crank shaft also actuates, through a worm and worm gear, the index or dial mechanism.

All of the construction described above is conventional mechanism, and my invention relates to novel means for controlling the flow of gas through the inlet port 6.

In accordance with my invention, I mount on the valve plate 5 guide tracks 19, which receive freely movable gate valves 20 and 21. Normally these gate valves or plates lie on opposite sides of the inlet port 6 so as to allow an unrestricted flow of gas through the port. Outward movement of the valves 20 and 21, beyond a certain point, is prevented by stop lugs 19' at the outer ends of the guide tracks 19 (see Figures 1 and 4). The plate or gate valve 20 is adapted to be automatically actuated from the crank shaft 17, should there be a flow of back pressure through the meter. The means for operating the plate or gate valve 20 from the crank shaft 17 includes a radially extending arm 22 secured to the crank of the crank shaft. Secured to the top face of the plate or gate valve 20 are brackets 23 and 24 which form supports for the clicks or stops 25 and 26.

The stops or clicks 25 and 26 are rockably mounted intermediate their ends on pivot pins 27 carried by their respective brackets, and their lower ends are weighted so that their arms 28 will be normally held in raised position above the brackets. The brackets also act as stops for the clicks in one direction in view of the fact that a part of the brackets are disposed in the path of the weighted ends of the clicks. The clicks are oppositely mounted relative to one another so that one click is free to swing unrestricted in one direction, and the other click will be free to swing unrestricted in the opposite direction. When the valve plates 20 and 21 are in their open position, the arm 28 of the click 26 is in the path of the radially extending arm 22, carried by the crank shaft 17. When the meter is operating under normal conditions, the crank shaft 17 is turned in a clockwise direction, and hence the arm 22 of the shaft will strike the arm 28 of the click 26 and swing the click inwardly. This gives unrestricted movement of the crank shaft when the same is rotating in a clockwise direction. However, should the crank shaft 17 be turned in a counter-clockwise direction, through any reason, such as by the flow of pressure in a retrograde direction through the meter, the arm 22 will strike in the rear of the arm 28 of the click 26, and as the click is held against swinging movement in this direction by its bracket, the gate valve or plate 20 will be immediately moved to its closed position, and further rotation of the shaft 17 is prevented. This pressure tends to hold the valve plate 20 on its seat. Not only does this immediately cut off further flow of pressure through the meter, thus avoiding accidents mentioned in the forepart of this application, but the breaking of the flag arms through reverse movement of the shaft is prevented.

As soon as the pressure of the gas returns, the same acts on the lower face of the valve plate 20, and lifts the valve plate slightly off of its seat (see the free play space between the valve plates and their guides in Figure 4) which permits a slight seepage of gas into the valve chamber. This seepage of gas balances the pressure at the inlet and in the meter. Thus, when the differential changes, such as by the opening of a gas cock, gas will be drawn through the meter. The shaft 17 will be rotated in a clockwise direction, and the arm 22 will then strike against the arm 28 of the click 25, and as this click 25 is held against rocking movement to the left (Figure 3) by its bracket the gate valve or plate 20 will be slid to its open position, allowing normal operation of the meter.

Should persons attempt to obtain gas through the meter, without operating the dial or index, by tipping the meter to one side or the other, either the valve plate 20, or the valve plate 21, will slide over the inlet port 6 by gravity. Thus the port will be immediately closed and the flow of gas through the meter will be stopped. The inlet and outlet pipes of the meter rigidly hold the same against tipping in one direction, and hence the meter can only be tipped in the direction mentioned, unless the sealed connections between the inlet and outlet pipes and the meter are broken.

If the valve plate 20 has been moved to a closed position by gravity, the same will be automatically returned to its normal position by the arm 22 when the meter is again righted. However, if the meter has been tipped to the left (Figure 1), and the valve plate 21 has slid to a closed position, it will be necessary to tip the meter to the right so that the valve plate 21 will slide by gravity to its open position. This will, however, move the valve plate 20 to a closed position, but when the meter is again righted, the arm 22 will automatically move the valve plate 20 to its open position.

From the foregoing description, it can be seen that I have provided an exceptionally simple and durable means for attachment with ordinary meters to prevent the theft of gas, and to effectively prevent the flow of pressure through a meter in reverse direction from normal.

Changes in details may be made without departing from the spirit or scope of this invention, but what I claim as new is:—

1. In a gas meter, a valve table having an inlet port, a crank shaft arranged to be operated by flow of gas through the meter, a valve plate freely slidable over the inlet port, a pivoted trip carried by the valve plate, said trip being freely movable in one direction and restrained against movement in the opposite direction, and a radially extending arm carried by the crank shaft disposed in the path of the trip, whereby upon movement of the crank shaft in a direction opposite to its normal rotation, the valve plate will be slid to a closed position over the inlet port.

2. In a gas meter, a valve table having an inlet port, a crank shaft arranged to be operated by flow of gas through the meter, a valve plate freely slidable over the inlet port, a pivoted trip carried by the valve plate, said trip being freely movable in one direction and restrained against movement in the opposite direction, a radially extending arm carried by the crank shaft disposed in the path of the trip, whereby upon movement of the crank shaft in one direction and opposite to its normal rotation, the valve plate will be slid to a closed position over the inlet port, and means arranged in the path of the radially extending arm for returning the valve plate to an open position after the closing thereof and when the crank shaft turns in its normal direction.

3. In a gas meter, a valve table having a gas inlet port, a crank shaft arranged to be operated by flow of gas through the meter, a slide valve plate freely movable over the inlet port, a radially extending arm secured to the crank shaft, a pair of trip arms rockably mounted on the valve plate, the trip arms being freely rockable in opposite directions relative to one another, and restrained against swinging movement in the other directions, one of said trips being normally arranged in the path of the radially extending arm when the valve plate is in its open position away from the inlet port, whereby when the shaft rotates in its normal direction, the arm will move past said trip, and when the shaft rotates in the opposite direction the arm will engage said mentioned trip to move the valve plate to a closed position over the inlet port, and to dispose the other trip in the path of the radially extending crank arm, as and for the purpose specified.

4. In a gas meter, a valve table having a gas inlet port, a crank shaft arranged to be operated by the flow of gas through the meter, slide valve plates mounted on opposite sides of the gas inlet port and freely movable over said port, whereby when the meter is tipped to one side or the other, one of said valve plates will be slid by gravity over the inlet port, and means for positively moving one of said valve plates over the inlet port when the crank shaft rotates in a reverse direction from normal.

5. A gas meter, a valve table having a gas inlet port, a crank shaft arranged to be operated by the flow of gas through the meter, slide valve plates mounted on opposite sides of the gas inlet port and freely movable over said port, whereby when the meter is tipped to one side or the other, one of the valve plates will be slid by gravity over the inlet port, means for positively moving one of said valve plates over the port when the crank shaft rotates in a reverse direction from normal, and means for returning the last mentioned valve plate to an open position upon rotation of the crank shaft in a normal direction.

FRANK S. BURNS.